Nov. 13, 1956  M. MITTENDREIN ET AL  2,770,464
UNDERCARRIAGE FOR VEHICLES DESIGNED TO RUN OVER UNEVEN
GROUND AND, IN PARTICULAR, UP AND DOWN STAIRS
Filed March 19, 1953  3 Sheets-Sheet 1
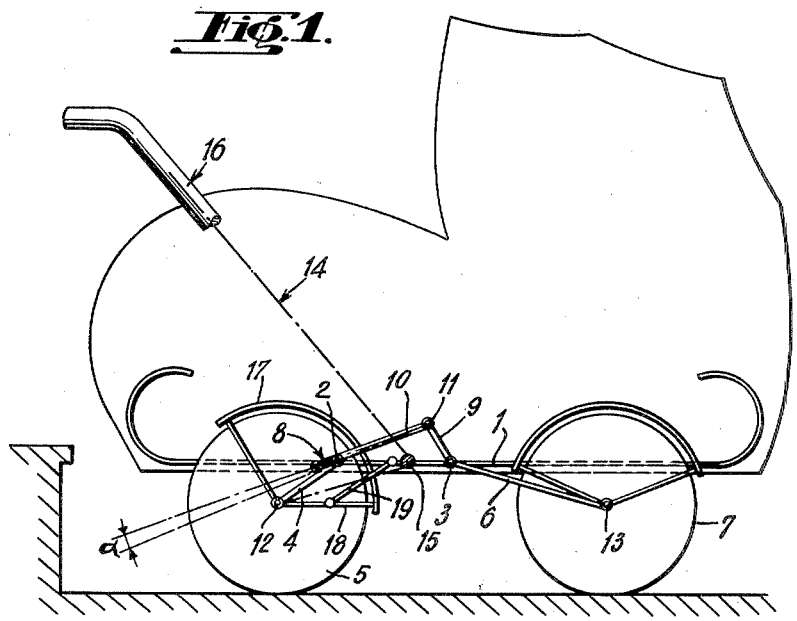
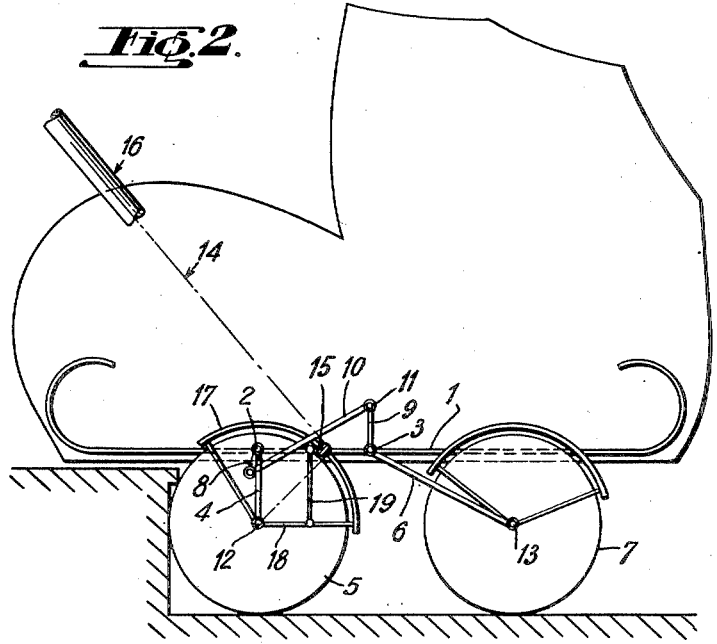
INVENTORS:
Michael MITTENDREIN
Herwig GÖBEL
By K. A. Mayr
ATTORNEY

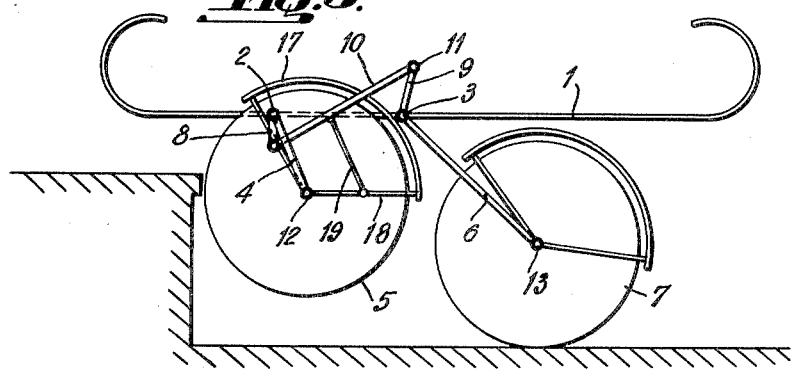
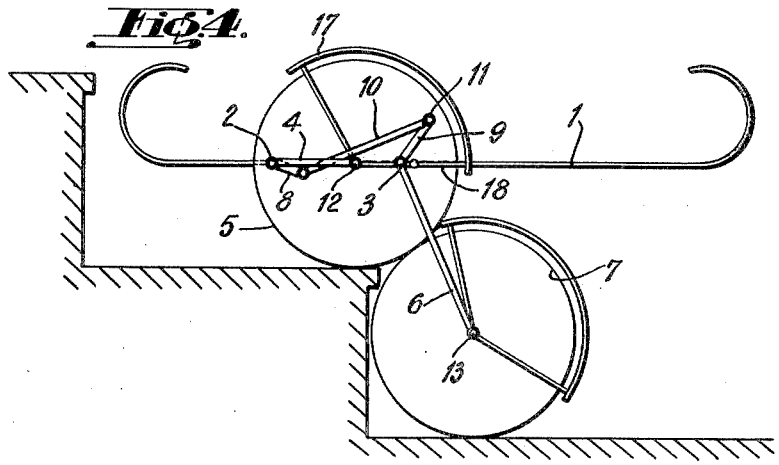
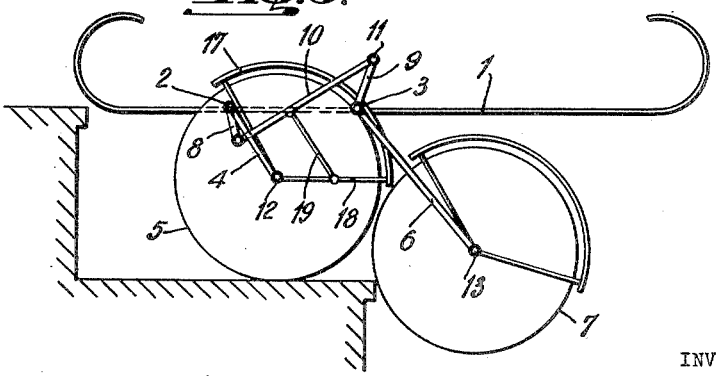
INVENTORS:
Michael MITTENDREIN
Herwig GÖBEL
ATTORNEY

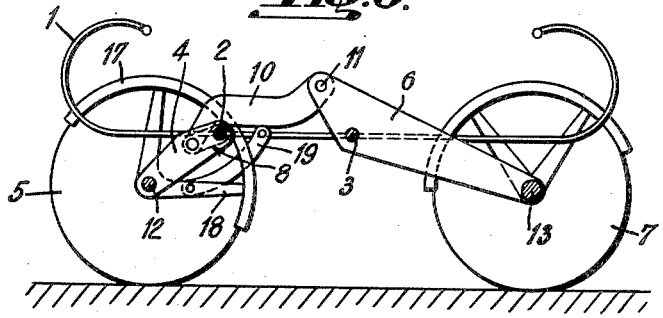
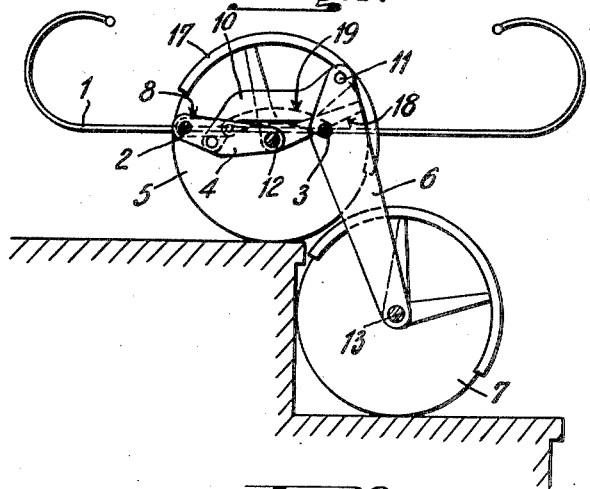
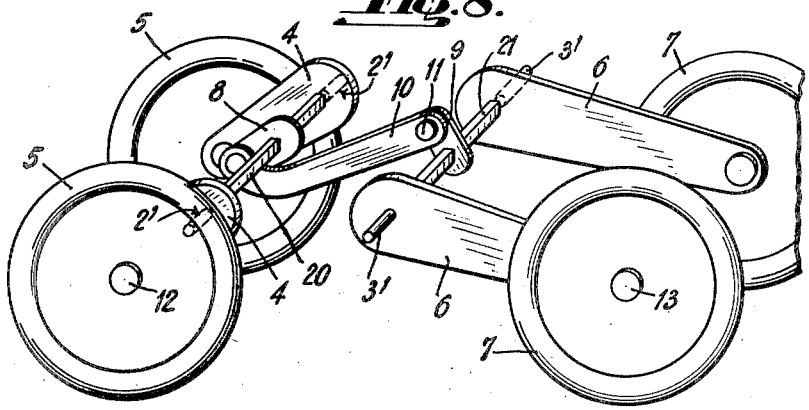
INVENTORS:
Michael MITTENDREIN
Herwig GÖBEL
By K. B. Mayr
ATTORNEY ized Nov. 13, 1956

United States Patent Office 2,770,464
Patented Nov. 13, 1956

2,770,464

UNDERCARRIAGE FOR VEHICLES DESIGNED TO RUN OVER UNEVEN GROUND AND, IN PARTICULAR, UP AND DOWN STAIRS

Michael Mittendrein and Herwig Göbel, Vienna, Austria, assignors to AVE Transportmittel Holding A. G., St. Moritz, Switzerland Application March 19, 1953, Serial No. 343,424

Claims priority, application Switzerland March 19, 1952

2 Claims. (Cl. 280—5.28)

The invention concerns an undercarriage for vehicles designed to run over uneven ground and, in particular, up and down stairs, and in which the front and rear wheel or wheels are connected so that their motions are interdependent and that they are able to change their position relatively to one another. The invention is suitable for application to vehicles of various kinds, such as hand carts for transporting goods from one floor level to another, baby and invalid carriages designed to be run up and down stairs, as well as vehicles designed to carry fairly heavy loads.

One knows of baby carriages, designed to be run up and down stairs, and fitted with swinging axles, in which at least one wheel axle forms, together with the arms carrying it, a U-shaped member, which, when the carriage is to be run up or down stairs, can be swung towards the other wheel axle, about an axis which is fixed in relation to the chassis, in order to shorten the wheelbase.

In another conventional baby carriage design of this type, there are two U-shaped members, each of which can swing about an axis which is fixed in relation to the chassis and which members are mechanically connected so as to effect swinging movements in opposite directions.

The object of the invention is to improve the running characteristics of such vehicles so that they can run over uneven ground or up and down stairs, by mounting the wheels independently without a connecting axle. This improves the running characteristics in curves and especially on winding stairs, and enables each wheel to be swung independently.

The undercarriage wheels can advantageously be mounted on the ends of carrier arms. Contrary to the known designs there are no rigid wheel axles each connecting two wheels and thus preventing the individual wheels from swinging independently.

The phrases "front and rear wheel axle" and "front and rear wheel" used in the present specification must be interpreted in relation to the direction of motion when the carriage is pulled upstairs by the handle bar.

According to the invention the fulcrums of the front and of the rear carrier arms or support levers are connected by shafts designed to act as torsion springs and rotatably fitted to the chassis, so that each carrier arm is individually enabled to give affording limited relative swinging of the support levers.

For facilitating operation of the vehicle when running downstairs the invention provides a mechanical device (cable, chain, rod, pedal, etc.) which may be actuated from the handle bar and enables the front wheel or front wheels, which is or are at the rear when running on the stairs, to be swung forward.

The device to bring the wheels closer together causes the vehicle chassis to be raised, and it may therefore be used to advantage in all cases where the chassis has to be raised to avoid collision with a curb, respectively where the front wheels have to be raised to the height of an obstacle such as a stair step, etc., as the weight of the load is shifted onto the rear wheels.

The novel features which are considered characteristic of the invention are set forth with particularity in the appended claims. The invention itself however and additional objects and advantages thereof will best be understood from the following description of embodiments thereof when read in connection with the accompanying drawing in which Fig. 1 is a diagrammatic illustration of the invention as applied to a baby carriage, the illustration being a side view of the mechanism according to the invention;

Figs. 2 to 5 are diagrammatic side views of a mechanism according to the invention in different operating positions;

Fig. 6 is a side view of a mechanism according to the invention showing the structural configuration of essential parts of the mechanism;

Fig. 7 shows the mechanism illustrated in Fig. 6 in a different operating position;

Fig. 8 is a perspective view of a mechanism according to the invention.

Like parts are designated by like numerals in all figures of the drawing.

Referring more particularly to Fig. 1 of the drawing a frame 1 is composed of laminated springs the ends of which carry the superstructure of the carriage (seat, platform, box for the load, etc.). To this frame are pivoted at the points 2 and 3, levers 4 for supporting the front wheels 5, and levers 6 for supporting the rear wheels 7. The lever 4 is declined towards the front and the lever 6 is declined towards the rear, both levers resting against abutments, not shown, fast on the frame 1.

A lever 8 is rigidly connected with a rod 20 interconnecting the levers 4, lever 9 being rigidly connected with a rod 21 interconnecting the levers 6. The free ends of the levers 8 and 9 are connected by a link 10. In the position of the undercarriage shown in Fig. 1, the link 10 is in such a position that a straight line connecting the pivots at the ends of the link 10 passes above the axis of rotation of the levers 4 and forms a small angle α with a straight line extending at a right angle to the axis of rotation of the levers 4 and intersecting the rotation axis of the pivot 11 at the end of the link 10 which is pivoted to the lever 9. If the lever 4 tends to swing downwards due to the weight of the wheel 5 and of the lever 4, a force is exerted by the lever 8 through the link 10 on the pivot 11 tending to swing the support levers 6 and the wheels 7 upwards. If the wheel 5 is moved towards the rear, the linkage 8, 10, 11, 9 tends to lift the wheel 7. If the whole vehicle is lifted off the ground the weights of the front and rear wheels act in opposite direction, so that the wheels cannot drop.

Only when the support lever 4 is subjected to a greater force, for instance, when the carriage is pushed against the step of a stair, the linkage 8, 10, 11, 9 places the undercarriage in the position shown in Fig. 2, rearward and downward swinging of the wheel 5 having caused a downward swinging movement towards the front of the wheel 7.

In the position of the mechanism shown in Fig. 2, the rotation axis 12 of the front wheel is situated vertically below the fulcrum of the levers 4. The linkage between the front and rear wheels is so arranged that the vertical downward displacement of the rotation axis 13 of the rear wheels is the same as that of the front wheels. The fulcrums of the levers 4 and 6 have been equally raised so that the frame 1 is again horizontal, but placed correspondingly higher.

Fig. 3 shows how the wheel 5 is swung further back under the frame and raised, and how, at the same time, the rear wheel helps to lift the undercarriage. Fig. 4 shows the position in which the front wheel has climbed to the step, and Fig. 5 the position in which the rear wheel has followed the front wheel onto this step.

The horizontal position of the frame during the operations shown in Figs. 3 and 5 is maintained by the hand gripping the handle bar 16 when the undercarriage rests on one wheel.

When the carriage is moved downstairs, which approximately corresponds to the successive operations shown in Figs. 5 to 1, the front wheel must first be swung towards the rear under the frame. A traction cable 14 is provided for this purpose. This cable runs over a pulley 15 and is guided along the handle bar 16. Instead of a traction cable, any other appropriate device (such as a lever, in particular a pedal) could be used to move the wheels 5 and 7 towards one another so that they raise the carriage.

If the mudguard were fixed to the lever 4, it would bump against the stair step upon swinging of the lever 4. To prevent this, one of the supports 18 of the mudguard is connected to the frame 1 by means of a link 19 in such manner that the support lever 4, the link 19 and the parts of the frame and of the support 18 between the points of articulation form an articulated parallelogram, so that the mudguard, which is free to rotate about the axis of the wheel, remains in substantially the same position.

Figs. 6 and 7 illustrate structural details of an undercarriage in the positions corresponding to those shown in Figs. 1 and 4. The corresponding parts are indicated by the same numbers. The support lever 4 and the lever 8 are combined in a unit. The levers 6 and 9 are also combined in a single unit.

Fig. 8 shows a perspective view of an undercarriage according to the invention including a torsion spring. The fulcrums of the levers 4 and 6 are connected by torsion rods 20, 21, respectively. The outer ends of these rods form trunnions 2', 3' which are mounted on the frame (in a manner which is not shown) to correspond to the points of articulation 2 and 3. The levers 8 and 9, as well as the link 10 are each single and common to both sides of the vehicle. All shocks caused by an uneven surface on which the vehicle is running are taken up by the elastic torsion of the rods 20 and 21.

An appropriate design of the undercarriage according to the invention could also be used for motor vehicles, or for vehicles with a hand or foot drive.

What we claim is:

1. An undercarriage for a baby carriage or the like comprising a frame, two first wheels, two second wheels, two first levers individually and coaxially swingably connected with said frame, each of said first levers having a free end supporting one of said first wheels, two second levers individually and coaxially swingably connected with said frame, each of said second levers having a free end supporting one of said second wheels, a first torsion rod interconnecting said first levers and extending coaxially of the swing axes of said first levers, a second torsion rod interconnecting said second levers and extending coaxially of the swing axes of said second levers, a linkage interconnecting said torsion rods and including means for swinging said second levers in a direction opposite to said first levers upon swinging of said first levers.

2. An undercarriage for a baby carriage or the like comprising a frame, two first wheels, two second wheels, two first levers coaxially swingably connected with said frame and individually swingably supporting said first wheels, means torsionally yieldably interconnecting said first levers for affording limited relative swinging of said first levers, two second levers coaxially swingably connected with said frame and individually swingably supporting said second wheels, means torsionally yieldably interconnecting said second levers for affording limited relative swinging of said second levers, means interconnecting said first two levers and said second two levers for swinging said second levers in a direction opposite to said first levers upon swinging of said first levers, and mud guards for at least two of said wheels, said mud guards being individually swingable on the rotation axes of said wheels, and links individually pivotally connected with said mud guards and with said frame, the rotation axes of the pivots of said links being parallel to and equally spaced from the fulcrums and from the rotation axes of the respective levers and wheels and the distance between the pivots of the individual links being the same as the distance between the fulcrums and the rotation axes of the respective levers.

References Cited in the file of this patent

UNITED STATES PATENTS

| | | |
|---|---|---|
| 572,658 | Marx | Dec. 8, 1896 |
| 857,696 | Weinstein | June 25, 1907 |
| 1,785,646 | Pascoo | Dec. 16, 1930 |
| 2,363,636 | Bloch et al. | Nov. 28, 1944 |
| 2,525,924 | Margiloff | Oct. 17, 1950 |
| 2,639,925 | Miklos | May 26, 1953 |

FOREIGN PATENTS

| | | |
|---|---|---|
| 166,141 | Austria | June 10, 1950 |
| 643,407 | Great Britain | Sept. 20, 1950 |